United States Patent
Nguyen

(10) Patent No.: US 7,465,155 B2
(45) Date of Patent: Dec. 16, 2008

(54) NON-AXISYMMETRIC END WALL CONTOURING FOR A TURBOMACHINE BLADE ROW

(75) Inventor: Bao Q. Nguyen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 11/364,686

(22) Filed: Feb. 27, 2006

(65) Prior Publication Data

US 2008/0232968 A1   Sep. 25, 2008

(51) Int. Cl.
*F01D 9/04* (2006.01)
(52) U.S. Cl. .............................. 416/193 R; 416/193 A; 416/234; 416/DIG. 2; 415/191; 415/210.1; 415/914
(58) Field of Classification Search ............... 415/191, 415/208.1, 208.2, 209.4, 210.1, 914; 416/189, 416/192, 193 R, 193 A, 195, 234, DIG. 2
See application file for complete search history.

(56) References Cited

U.S. PATENT DOCUMENTS

| | | | |
|---|---|---|---|
| 2,918,254 A * | 12/1959 | Hausammann | 415/914 |
| 4,135,857 A | 1/1979 | Pannone et al. | |
| 4,465,433 A | 8/1984 | Bischoff | |
| 4,778,338 A * | 10/1988 | Bessay | 415/914 |
| 5,215,439 A * | 6/1993 | Jansen et al. | 415/914 |
| 5,397,215 A * | 3/1995 | Spear et al. | 415/191 |
| 5,466,123 A * | 11/1995 | Rose | 415/914 |
| 6,017,186 A | 1/2000 | Hoeger et al. | |
| 6,283,713 B1 | 9/2001 | Harvey et al. | |
| 6,511,294 B1 | 1/2003 | Mielke et al. | |
| 6,524,070 B1 | 2/2003 | Carter | |
| 6,561,761 B1 * | 5/2003 | Decker et al. | 415/191 |
| 7,220,100 B2 * | 5/2007 | Lee et al. | 415/191 |
| 2003/0143068 A1 | 7/2003 | Kawasaki | |

* cited by examiner

*Primary Examiner*—Christopher Verdier
(74) *Attorney, Agent, or Firm*—Ingrassia, Fisher & Lorenz, P.C.

(57) ABSTRACT

A turbomachine blade row is provided having a hub that includes a non-axisymmetric end wall modified by a transformation function. The blade row further includes a circumferential row of a plurality of airfoil members radially extending from the non-axisymmetric end wall of the hub and forming a plurality of sectoral passages therebetween. A radius of the non-axisymmetric end wall is determined by a transformation function including a plurality of geometric parameters defined by a user based on flow conditions. The plurality of geometric parameters provide for modification of the end wall in both an axial and a tangential direction to include a plurality of concave profiled regions and convex profiled regions.

13 Claims, 2 Drawing Sheets

NON-AXISYMMETRIC END WALL CONTOURING FOR A TURBOMACHINE BLADE ROW

TECHNICAL FIELD

The present invention relates to turbomachines and, more particularly, to the contouring of an end wall on a turbomachine blade row.

BACKGROUND

Turbomachines are used in myriad applications, including in air turbomachine starters used in aircraft engines. Typically, a turbomachine includes a turbomachine blade row comprised of a plurality of generally radially extending turbomachine airfoil members or airfoil members that are each mounted to an annular duct through which a compressible fluid flows. The airfoil members are spaced apart and positioned such that the annular duct rotates when a pressure differential is created across the two sides of the airfoils. Where a plurality of rows of airfoil members are formed, each row of aerofoil members divides the duct into a series of airfoil passages, each bounded by the facing suction and pressure surfaces of adjacent pairs of airfoil members in the row. Generally, each airfoil member is similarly sized and shaped.

During the engine operation, a three-dimensional flow in the airfoil passages represents a difficult problem in fluid mechanics. The flow field within the airfoil passages is complex and includes a number of secondary vortical flows which are a major source of energy loss. Reference can be made to Langston (1977) "Three-Dimensional Flow Within A Turbomachine Cascade Passage", Transactions of the ASME, Journal of Engineering for Power, Vol. 99, pp 21-28 for a detailed discussion of these flows. The importance of these secondary flows increases with increase of aerodynamic duty or decrease in the aspect ratio of the airfoils. Not only is there energy dissipation in the secondary flows themselves, but they can also adversely affect the fluid flow downstream because they cause deviation of the angles of the flow exiting from the row of aerofoil members.

It has been found that an end wall of the turbine blade row to which the airfoil members are mounted and its boundary layers influence the formation of these secondary flows. Various attempts have been made in the past to modify the design of these turbomachines to eliminate these secondary vortical flows. For example, some designs include the addition of a fillet between the airfoil members and the end wall to reduce the secondary vortical flow generated from a blunt leading edge of the airfoils. Other designs reduce the secondary flow by compound leaning of the airfoil shape in a radial direction. Still other designs have re-shaped the end wall by applying varying functions in the axial direction and sloping the end wall in the circumferential or tangential direction Although the above-mentioned modifications may address the formation of the secondary vortical air flows in the airfoil passages, they may not adequately reduce the secondary flow and are complex in calculation and achievement. Specifically, the past methods suggest solutions to mitigate current effects by relying on end wall modification based on multiple functions, rather than a simplified function that allows the modification of the end wall in both the circumferential and axial directions.

Therefore, there is a need for a simple method of modifying an end wall design and an end wall design that specifically addresses the secondary flow effects in the airfoil passages. The present invention addresses these needs.

BRIEF SUMMARY

The present invention provides a turbomachine blade row including a hub and a plurality of airfoil members. The plurality of airfoil members extend from the hub. Each airfoil member has a base, a tip, a pressure surface, and a suction surface. The plurality of airfoil members create therebetween a plurality of sectoral passages.

In one embodiment, and by way of example only, a turbomachine blade row is provided and includes a non-axisymmetric end wall of the hub that reduces the secondary vortical flows there through the sectoral passages. The turbomachine blade row includes a non-axisymmetric end wall that has been modified in a circumferential direction, and/or an axial direction by a transformation function which contains two characteristic geometric parameters. By varying these two parameters in light of current flow conditions, a new shape for the end wall, which is no longer axisymmetric, is obtained. As a result, the secondary flow structure on the end wall is altered and its loss can be monitored. The two geometric parameters are established by a series of numerical analysis to optimize the turbomachine performance.

Other independent features and advantages of the preferred turbomachine blade row will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or its application and uses. Furthermore, there is no intention to be bound by any theory presented in the preceding background or the following detailed description. In this regard, before proceeding with the detailed description, it will be appreciated that the present invention is not limited to use with a particular type or configuration of turbomachine blade row, and it will be appreciated that the embodiments could also be used in conjunction with any blade row having airfoil members or airfoil members extending therefrom and having formed therebetween airfoil passages where pressure changes can be accurately measured or predicted during the design of the object. By modifying the end wall design of between the opposed aerofoil members, the generation of the passage vortex can be altered and the energy losses in the resulting secondary vortical flows can be reduced.

Figure 1:
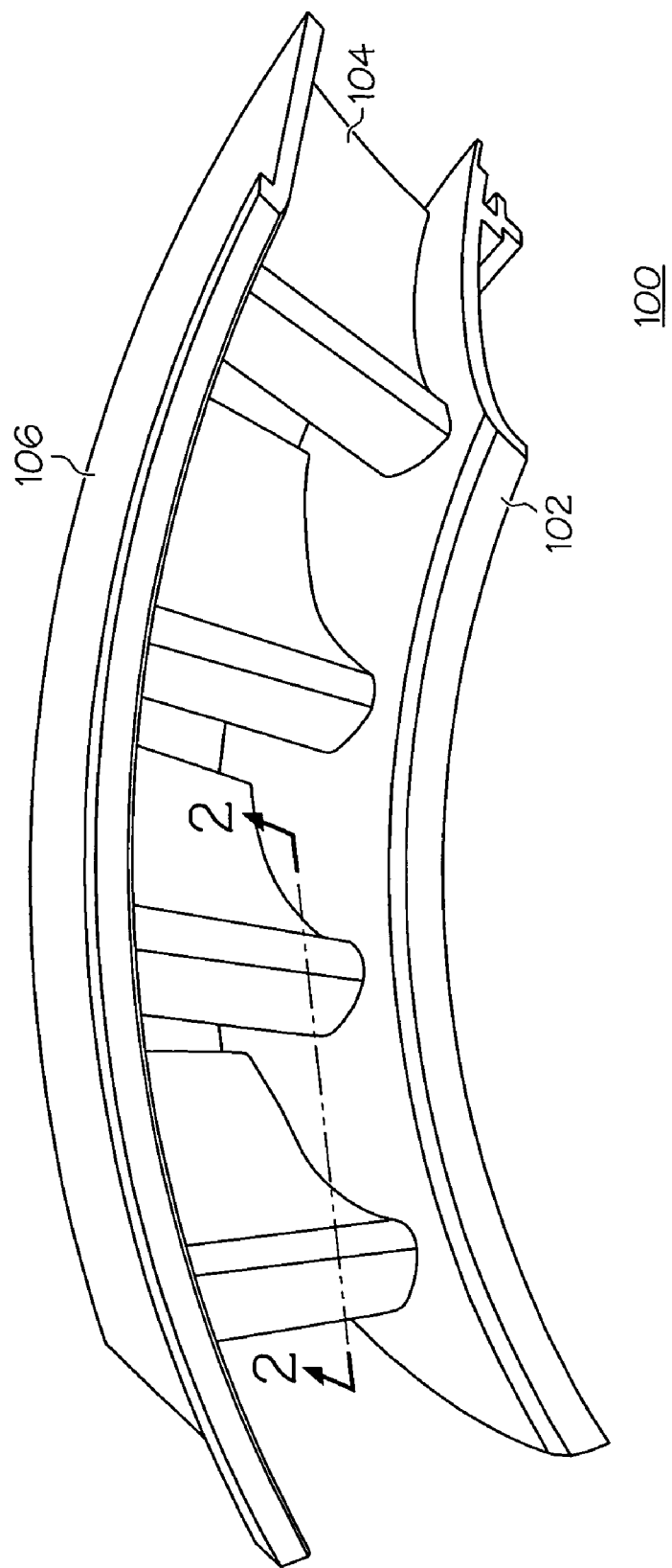
FIG. 1 is a perspective view of an exemplary turbomachine blade row.

Turning now to FIG. 1, an exemplary turbomachine blade row 100 is illustrated therein. The turbomachine blade row 100 includes a hub 102, a shroud 106 and a plurality of airfoil members 104 extending from 102 to 106. The hub 102, shroud 106 and plurality of airfoil members 104 are preferably formed from a single piece of material to achieve optimal weight and cost efficiency, however, it will be appreciated that the hub 102, shroud 106 and airfoil members 104 may be separately manufactured and subsequently coupled to one another as well. The hub 102 and shroud 106 are substantially circular in shape.

The airfoil members 104 are arranged around the outer periphery of the hub 102, preferably, in a configuration that optimizes the efficiency of the stationary turbomachine blade row 100. For example, the airfoil members 104 may be equally spaced apart from one another or arranged in a repetitive or a non-repetitive pattern. As illustrated in FIG. 1, the airfoil members 104 each have substantially the same shape, however, it will also be appreciated that the airfoil members 104 may have different shapes. The airfoil members 104 are configured to efficiently extract work from the working fluid supplied thereto, and to convert it into mechanical torque. The airfoil members 104 may also be designed for efficient compression or propulsion of the working fluid, such as in a compressor, a fan, or a propeller. In these regards, each of the airfoil members 104 may have any one of numerous shapes.

Figure 2:
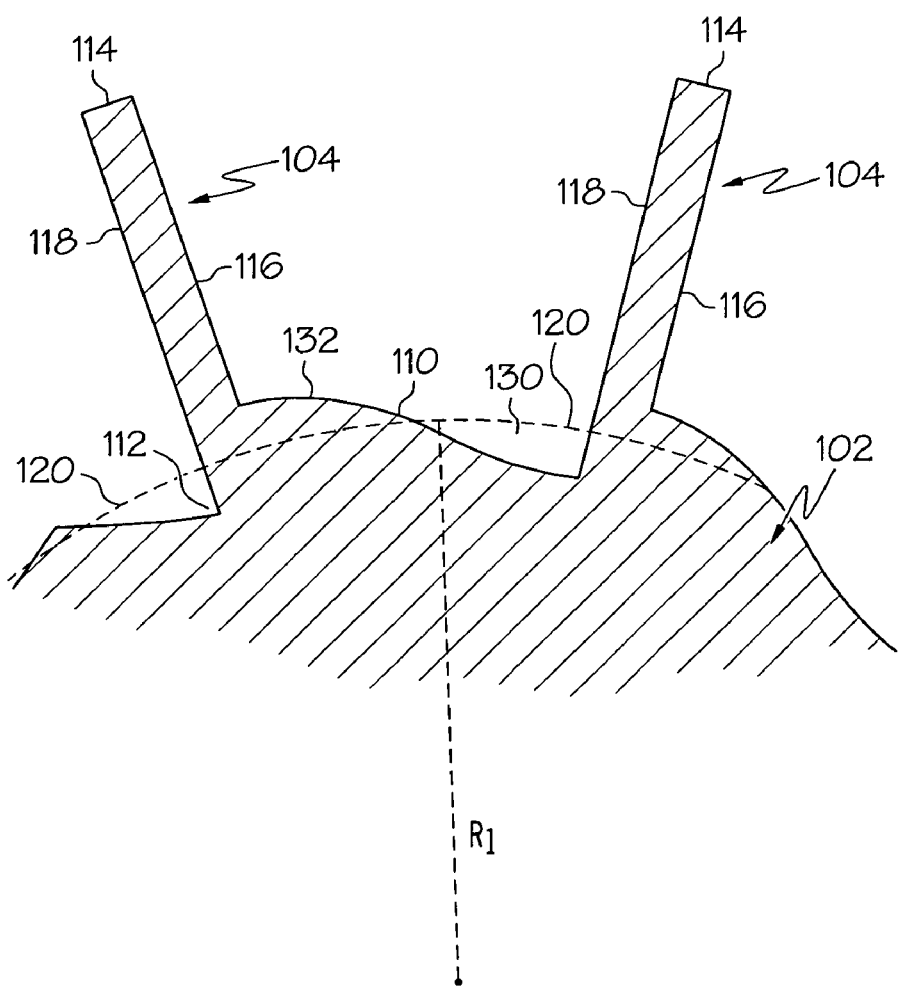
FIG. 2 is a partial cross-sectional view taken through line 2-2 of FIG. 1 illustrating a plurality of exemplary turbomachine airfoil members that may extend from the non-axisymmetric end wall of the exemplary turbomachine blade row depicted in FIG. 1.

Turning to FIG. 2, illustrated in partial cross-section taken through line 2-2 of FIG. 1 is the turbomachine blade row 100, showing the hub 102 that in this particular embodiment includes a modified wall to which the airfoil members 104 are attached. This modified wall is referred to herein as an end wall 110. As illustrated, each of the airfoil members 104 has a base 112 proximate the end wall 110, a tip 114, a pressure surface 116 and a suction surface 118. Illustrated in dashed line is a typical axisymmetric end wall 120, illustrating axial symmetry in contrast to modified end wall 110. To reduce secondary vortical flow, axisymmetric end wall 120 is modified during manufacturing according to a single transformation function. The transformation function is based on a sinusoidal function having two characteristic geometric parameters to form modified end wall 110. The sinusoidal transformation function is not in phase with the pitch of airfoil members 104. As is generally known, the airfoil pitch may be referred to as the tangential distance between adjacent airfoil members 104. More specifically, the sinusoidal transformation function has a period of $\pi$ across the pitch of airfoil members 104. By varying the transformation function, and in particular the two geometric parameters, a new shape for the modified end wall 110 is obtained. The incorporation of two geometric parameters provides for modification of end wall 110 in both the tangential direction and axial direction. The two geometric parameters that are utilized to form modified end wall 110 are established by a series of numerical analyses to optimize the blade row performance. As a result, the secondary flow structure on the end wall 110 is altered and its loss can be monitored.

A typical end wall, such as that depicted by end wall 120 of FIG. 2 is defined by two geometric coordinates, one in the axial direction (X) and the other in the radial direction (R). To reshape or modify the geometry of end wall 120 at any axial location, a transformation function is used to modify the radius. More specifically, at any axial location "x" along the hub surface, the radius ($R_2$) of modified end wall 110 is determined by the transformation function:

$$R_2(x)=R_1(x)+\Delta R(x)$$

where $R_2(x)$ is the radius of the modified hub end wall 110 at x;

$R_1(x)$ is the radius of the original hub wall 120 at x; and
$\Delta R(x)=K(x)\,[\cos(\theta+\phi)+2\sin\phi/\pi]$;

where coefficient K(x) is a function of the local pressure gradient in a circumferential direction at that axial location:

$$K(x)=\alpha\Delta P(x)=\alpha(P_{ps}-P_{ss})$$

where $P_{ps}$ is the pressure exerted on the pressure surface and $P_{ss}$ is the pressure exerted on the suction surface;

where $\theta$ is a circumferential location along the end wall 110; and $\phi$ and $\alpha$ are geometric parameters defined by the designer based on specific flow conditions.

Figure 3:
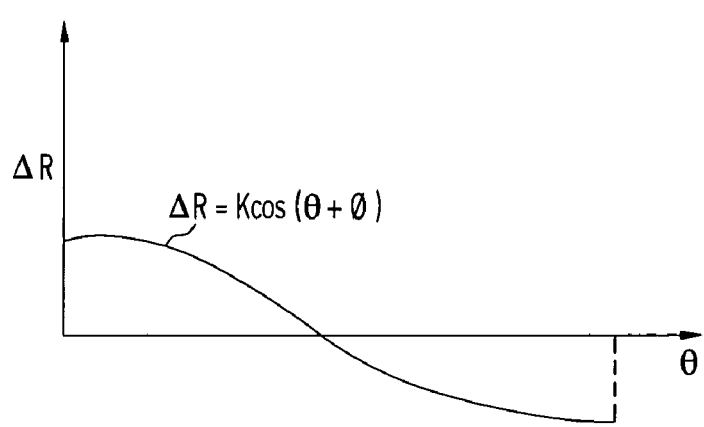
FIG. 3 is a graph depicting an exemplary transformation function used to modify the end wall of the exemplary turbomachine blade row FIG. 1.

Referring now to FIG. 3, illustrated graphically is the transformation function of the present invention that is utilized to modify end wall 110. As illustrated, by varying geometric parameter $\theta$ (a circumferential location along the end wall 110) a new radius for the hub wall shape is achieved, When $\theta=0$ the highest radius is located near the airfoil pressure surface and the lowest radius near the suction surface, and when $\theta=\pi$ the reverse distribution is obtained. K is a proportionality parameter to link the pressure gradient with the modified end wall shape.

After a modified radius for end wall 120 is determined, the appropriate modifications are generally applied to an airfoil/hub geometry prior to manufacturing. Typically, a revised turbomachine model including the modified non-axisymmetric end wall 110 is generated. Preferably, the modified end wall 110 blends smoothly and continuously after the modifications have been applied thereto. In one exemplary embodiment, a Lagrangian interpolation is used to generate a smooth surface through points in the revised turbomachine representing the modified end wall 110, however, it will be appreciated that any other similar method may be employed as well.

As best illustrated in FIG. 2, modified end wall 110 is defined by a non-axisymmetric cross-modified end wall 110 and a concave profiled region 130. In this particular embodiment, concave profiled region 130 is formed adjacent the suction surface 118 of at least one of the airfoil members 104, and convex profiled region 132 is formed adjacent the pressure surface 116 of at least one of the airfoil members 104. Concave profiled region 130 and convex profiled region 132 are preferably formed complementary to each other so that the cross-section of the passage between the airfoil members 104 is not significantly altered. It should be understood that in an alternative embodiment, anticipated is a modified end wall in which the cross-section of a passage between the airfoil members adjacent the modified end wall is significantly changed, and the convex profiled region and the concave profiled region are not formed complementary.

The modified end wall 110 may also be subjected to a computational fluid dynamics analysis to determine whether the modified end wall's aerodynamic behavior produces the behavior of that originally anticipated. In one exemplary embodiment, the geometric definition of the modified end wall is prescribed in an analysis package for predicting fluid dynamic behavior, including but not limited to, Fluent (distributed by Fluent Inc. of Lebanon, N.H.) or CFX (distributed by ANSYS Inc. of Canonsburg, Pa.). The analysis is used to predict how the modified end wall 110 will impact the aerodynamic performance of the revised turbomachine, which can be compared to a prediction of the aerodynamic behavior of the original turbomachine including an axisymmetric end wall. If the aerodynamic behavior is unacceptable, the transformation function parameters can be revised slightly until an acceptable value aerodynamic behavior is achieved.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A turbomachine blade row comprising:
a hub including a non-axisymmetric end wall modified by a transformation function; and
a circumferential row of spaced apart airfoil members radially extending from the non-axisymmetric end wall of the hub, each airfoil member having a base, a tip, a pressure surface and a suction surface;
wherein a radius ($R_2$) of the non-axisymmetric end wall is determined by the transformation function:

$$R_2(x) = R_1(x) + \Delta R(x)$$

where $R_2(x)$ is the radius of the non-axisymmetric end wall;
$R_1(x)$ is a radius of an original axisymmetric hub end wall; and
$\Delta R(x) = K(x)[\cos(\theta + \phi) + 2 \sin \phi/\pi]$;
where coefficient $K(x)$ is a function of a local pressure gradient in a circumferential direction at a specific axial location:

$$K(x) = \alpha \Delta P(x) = \alpha(P_{ps} - P_{ss})$$

where $P_{ps}$ is a pressure exerted on the pressure surface of one of the plurality of airfoil members and $P_{ss}$ is a pressure exerted on the suction surface of an adjacent one of the plurality of airfoil members;
where $\theta$ is a circumferential location along the non-axisymmetric end wall; and
$\phi$ and $\alpha$ are geometric parameters defined by a designer based on a specific flow condition.

2. The turbomachine blade row of claim 1, wherein the transformation function is a sinusoidal transformation function.

3. The turbomachine blade row of claim 1, wherein the non-axisymmetric end wall is modified in an axial direction and a tangential direction by the transformation function.

4. The turbomachine blade row of claim 1, wherein the transformation function has a period of $\pi$ across a tangential distance between adjacent airfoil members.

5. The turbomachine blade row of claim 1, wherein the non-axisymmetric end wall includes a concave profiled region and a convex profiled region.

6. The turbomachine blade row of claim 5, wherein the concave profiled region is adjacent the suction surface of at least one of the plurality of airfoil members and the convex profiled region is adjacent the pressure surface of at least one of the plurality of airfoil members.

7. The turbomachine blade row of claim 5, wherein the concave profiled region and the convex profiled region are complementary and do not alter a cross-sectional area of a sectoral passage formed between adjacent airfoil members of the plurality of airfoil members.

8. The turbomachine blade row of claim 1, wherein the hub and the plurality of airfoil members are formed from a single piece of material.

9. A turbomachine blade row comprising:
a hub, including a non-axisymmetric end wall modified in an axial direction and a tangential direction by a sinusoidal transformation function; and
a circumferential row of a plurality of airfoil members radially extending from the end wall of the hub and forming a plurality of sectoral passages therebetween, each airfoil member having a base, a tip, a pressure surface and a suction surface;
wherein the sinusoidal transformation function has a period of $\pi$ across a tangential distance between adjacent airfoil members; and
wherein a radius ($R_2$) of the end wall is determined by the sinusoidal transformation function:

$$R_2(x) = R_1(x) + \Delta R(x)$$

where $R_2(x)$ is the radius of the non-axisymmetric end wall;
$R_1(x)$ is a radius of an original axisymmetric end wall; and
$\Delta R(x) = K(x)[\cos(\theta + \phi) + 2 \sin \phi/\pi]$;
where coefficient $K(x)$ is a function of a local pressure gradient in a circumferential direction at a specific axial location:

$$K(x) = \alpha \Delta P(x) = \alpha(P_{ps} - P_{ss})$$

where $P_{ps}$ is a pressure exerted on the pressure surface of one of the plurality of airfoil members and $P_{ss}$ is a pressure exerted on the suction surface of an adjacent one of the plurality of airfoil members;
where $\theta$ is a circumferential location along the non-axisymmetric end wall; and
$\phi$ and $\alpha$ are geometric parameters defined by a designer based on a specific flow condition.

10. The turbomachine blade row of claim 9, wherein the non-axisymmetric end wall includes a concave profiled region and a convex profiled region.

11. The turbomachine blade row of claim 10, wherein the concave profiled region is adjacent the suction surface of at least one of the plurality of airfoil members and the convex profiled region is adjacent the pressure surface of at least one of the plurality of airfoil members.

12. The turbomachine blade row of claim 10, wherein the concave profiled region and the convex profiled region are complementary and do not alter a cross-sectional area of the sectoral passage formed between adjacent airfoil members of the plurality of airfoil members.

13. A turbomachine blade row comprising:
a hub, including a non-axisymmetric end wall modified in an axial direction and a tangential direction by a sinusoidal transformation function; and
a circumferential row of a plurality of airfoil members radially extending from the end wall of the hub and forming a plurality of sectoral passages therebetween, the non-axisymmetric end wall defined by a plurality complementary pairs of a concave profiled region and a convex profiled region within each of the plurality of sectoral passages;
wherein the complementary pairs of the concave profiled region and the convex profiled region do not alter a cross-sectional area of the plurality of sectoral passages;
wherein the sinusoidal transformation function has a period of $\pi$ across a tangential distance between adjacent airfoil members; and
wherein a radius ($R_2$) of the non-axisymmetric end wall is determined by the sinusoidal transformation function:

$$R_2(x) = R_1(x) + \Delta R(x)$$

where $R_2(x)$ is the radius of the non-axisymmetric end wall;

$R_1(x)$ is a radius of an original axisymmetric hub end wall; and $\Delta R(x) = K(x) [\cos(\theta + \phi 2 \sin/\pi)]$;

where coefficient $K(x)$ is a function of a local pressure gradient in a circumferential direction at a specific axial location;

$K(x) = \alpha \Delta P(x) = \alpha (P_{ps} - P_{ss})$ where $P_{ps}$ is a pressure exerted on the pressure surface of one of the plurality of airfoil members and $P_{ss}$ is a pressure exerted on the suction surface of an adjacent one of the plurality of airfoil members;

where $\theta$ is a circumferential location along the end wall; and $\phi$ and $\alpha$ are geometric parameters defined by a designer based on a specific flow condition.

* * * * *

UNITED STATES PATENT AND TRADEMARK OFFICE
CERTIFICATE OF CORRECTION

PATENT NO.        : 7,465,155 B2
APPLICATION NO.   : 11/364686
DATED             : December 16, 2008
INVENTOR(S)       : Bao Q. Nguyen Page 1 of 1

It is certified that error appears in the above-identified patent and that said Letters Patent is hereby corrected as shown below:

Column 7, line 5, the formula should read as follows:

$$\Delta R(x) = K(x) [\cos'(\theta + \phi) + 2\sin\phi/\pi]$$

Signed and Sealed this

Sixteenth Day of June, 2009

JOHN DOLL
*Acting Director of the United States Patent and Trademark Office*